(12) United States Patent
Iida et al.

(10) Patent No.: US 12,289,062 B2
(45) Date of Patent: Apr. 29, 2025

(54) POWER CONVERSION APPARATUS, MOTOR DRIVE APPARATUS, AND AIR CONDITIONER

(71) Applicant: Mitsubishi Electric Corporation, Tokyo (JP)

(72) Inventors: Takeshi Iida, Tokyo (JP); Satoru Ichiki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 18/270,668

(22) PCT Filed: Mar. 4, 2021

(86) PCT No.: PCT/JP2021/008477
§ 371 (c)(1),
(2) Date: Jun. 30, 2023

(87) PCT Pub. No.: WO2022/185484
PCT Pub. Date: Sep. 9, 2022

(65) Prior Publication Data
US 2024/0072680 A1    Feb. 29, 2024

(51) Int. Cl.
*H02M 7/217* (2006.01)
*H02M 1/00* (2007.01)
*H02M 1/42* (2007.01)

(52) U.S. Cl.
CPC ....... *H02M 7/2173* (2013.01); *H02M 1/0043* (2021.05); *H02M 1/4225* (2013.01)

(58) Field of Classification Search
CPC . H02M 1/0043; H02M 1/4225; H02M 7/2173
See application file for complete search history.

(56) References Cited

U.S. PATENT DOCUMENTS

| 9,847,735 B2 | 12/2017 | Shimomugi et al. |
| 2010/0226149 A1* | 9/2010 | Masumoto .......... H02M 3/1584 363/20 |

(Continued)

FOREIGN PATENT DOCUMENTS

| JP | 2013-192349 A | 9/2013 |
| JP | 2013-220028 A | 10/2013 |

(Continued)

OTHER PUBLICATIONS

International Search Report of the International Searching Authority mailed May 18, 2021 in corresponding International Patent Application No. PCT/JP2021/008477 (and English translation).

*Primary Examiner* — Jue Zhang
(74) *Attorney, Agent, or Firm* — Posz Law Group, PLC

(57) ABSTRACT

A power conversion apparatus includes a converter circuit and a control unit. The converter circuit includes circuits for the number of phases being more than one, the circuits each including a reactor and a corresponding first or second switching element connected to the reactor. The converter circuit converts an AC voltage output from a commercial power supply into a DC voltage. In a case where a time difference between a timing of turning off the first switching element and a timing of turning on the second switching element is within a threshold, the control unit performs control for advancing or delaying the timing of turning off the first switching element.

8 Claims, 8 Drawing Sheets

(56) References Cited

U.S. PATENT DOCUMENTS

2012/0313614 A1* 12/2012 Ohshita ................ H02M 3/155
  323/311
2019/0319541 A1* 10/2019 Murakami .......... H02M 1/4225
2020/0389086 A1* 12/2020 Messi Bene Eloundou ................
  H02M 1/4225

FOREIGN PATENT DOCUMENTS

| JP | 2016-086463 A | 5/2016 |
| JP | 6041866 B2 | 12/2016 |
| JP | 2019-126182 A | 7/2019 |
| JP | 2020-124064 A | 8/2020 |
| JP | 2020-178399 A | 10/2020 |
| WO | 2020/174531 A1 | 9/2020 |

* cited by examiner

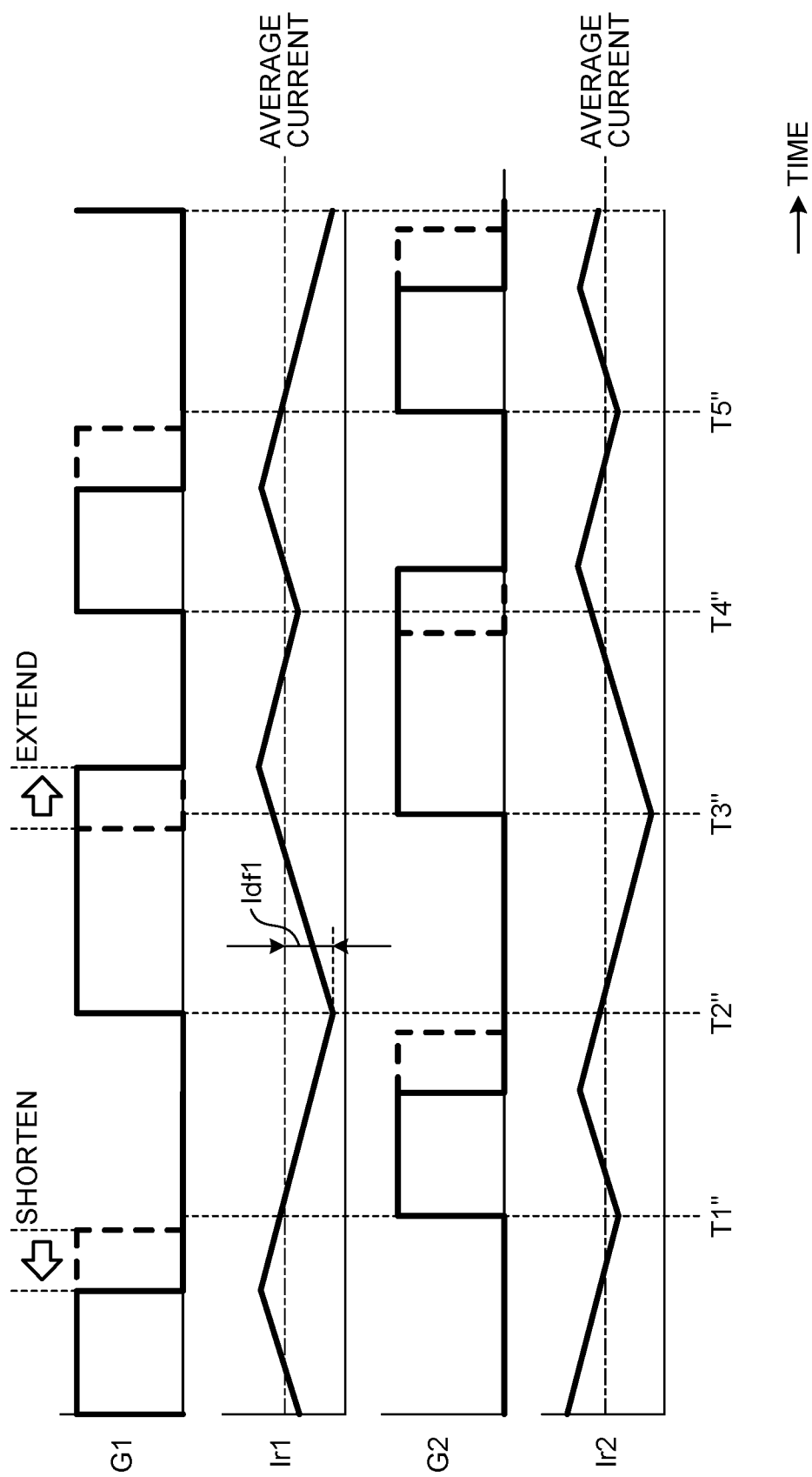

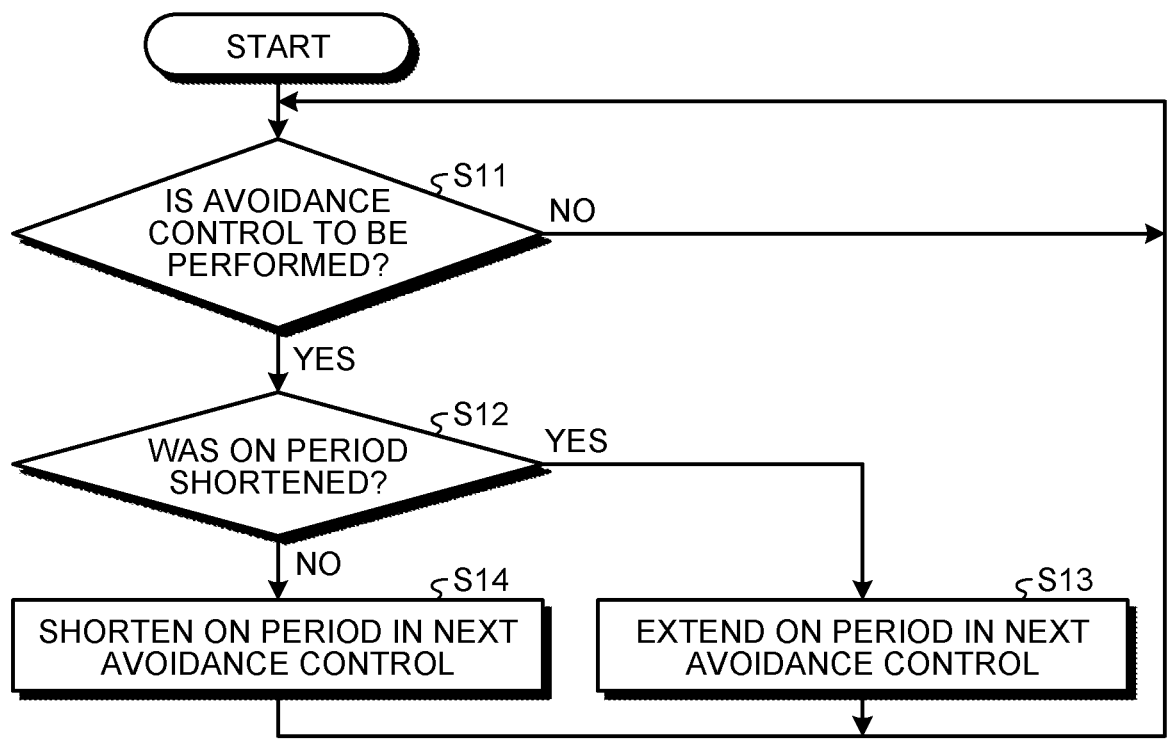

POWER CONVERSION APPARATUS, MOTOR DRIVE APPARATUS, AND AIR CONDITIONER

CROSS REFERENCE TO RELATED APPLICATION

This application is a U.S. national stage application of PCT/JP2021/008477 filed on Mar. 4, 2021, the contents of which are incorporated herein by reference.

FIELD

The present disclosure relates to a power conversion apparatus that converts an AC voltage output from an AC power supply into a DC voltage, a motor drive apparatus including the power conversion apparatus, and an air conditioner including the motor drive apparatus.

BACKGROUND

An air conditioner is one of application products of a motor drive apparatus. In order to prevent a failure due to a harmonic component included in power supply current, regulations on harmonics of input current have been set for air conditioners. For example, in Japan, a limit value has been set for harmonics of input current in Japanese Industrial Standards (JIS). Therefore, air conditioners may be provided with a power factor correction (PFC) circuit that is a power factor improvement circuit for reducing harmonics of input current to improve a power factor.

A first example of the PFC circuit is a booster circuit using a plurality of switching elements and reactors. A second example of the PFC circuit is an interleaved converter in which a plurality of boost chopper circuits are connected in parallel.

The interleaved converter provides a constant phase difference between the timings of turning on switching elements of the plurality of boost chopper circuits, and controls ON periods in which the switching elements are conducting, so that it is possible to obtain an input current of a desired magnitude while reducing harmonics.

As an example of a conventional technique, Patent Literature 1 below discloses an air conditioner including an interleaved converter and having an improved power factor.

PATENT LITERATURE

Patent Literature 1: Japanese Patent No. 6041866

When a switching element is turned on or off, surge voltage is generated at a terminal of the switching element due to an inductance component of a wire of a circuit. The surge voltage is a voltage having a waveform rising in a spike-like manner. In particular, a plurality of switching elements are separately turned on and off in the interleaved converter. Therefore, when the plurality of switching elements are turned on and off at relatively close timings, surge voltages may be superimposed on each other and become higher than when the plurality of switching elements are turned on and off at timings that are not close to each other. In this case, it is necessary to increase the voltage resistance of the switching elements. Thus, there is a problem in that the switching elements become expensive, leading to an increase in the size and manufacturing cost of boost chopper circuits. Alternatively, it is necessary to increase the capacity of a snubber circuit to be used to reduce surge voltage. Therefore, there is a problem in that the snubber circuit increases in size, and parts to be used for the snubber circuit become expensive, so that the manufacturing cost of the snubber circuit increases.

SUMMARY

The present disclosure has been made in view of the above, and an object of the present disclosure is to obtain a power conversion apparatus capable of preventing generation of surge voltage while preventing an increase in the size and manufacturing cost of the apparatus.

In order to solve the above-described problems and achieve the object, a power conversion apparatus according to the present disclosure includes a converter circuit and a control unit. The converter circuit includes circuits for the number of phases being more than one, the circuits each including a reactor and a switching element connected to the reactor, and the converter circuit converts an AC voltage output from an AC power supply into a DC voltage. The control unit controls operation of a plurality of the switching elements. In a case where a time difference between a timing of turning off a first switching element and a timing of turning on a second switching element is within a threshold, the control unit performs avoidance control for advancing or delaying the timing of turning off the first switching element. The first switching element is one of the switching elements. The second switching element is different from the first switching element.

The power conversion apparatus according to the present disclosure has the effect of preventing generation of surge voltage while preventing an increase in the size and manufacturing cost of the apparatus.

BRIEF DESCRIPTION OF DRAWINGS

FIG. 7 is a waveform chart for describing operation of a converter circuit in a second embodiment.

FIG. 8 is a flowchart illustrating an operation flow of control to be performed in the second embodiment.

DETAILED DESCRIPTION

Hereinafter, a power conversion apparatus, a motor drive apparatus, and an air conditioner according to embodiments of the present disclosure will be described in detail with reference to the drawings. Note that application to an air conditioner will be described as an example in the following embodiments, but this is not intended to exclude application to other uses.

First Embodiment

Figure 1:
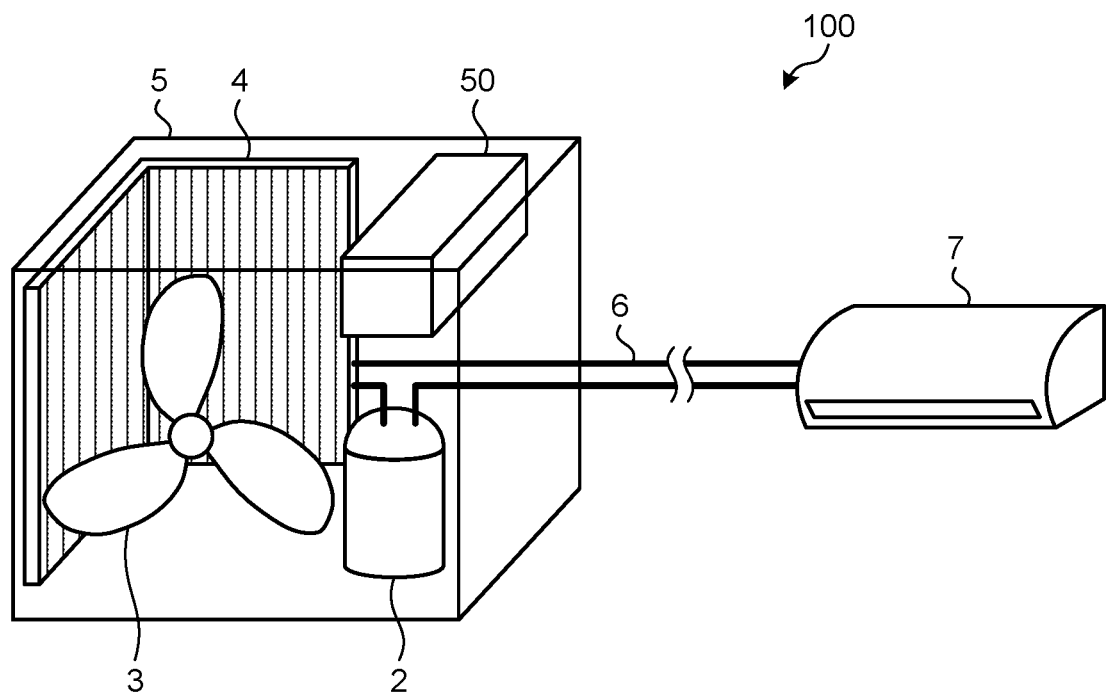
FIG. 1 is a diagram showing an exemplary configuration of an air conditioner including a motor drive apparatus according to a first embodiment.
Figure 2:
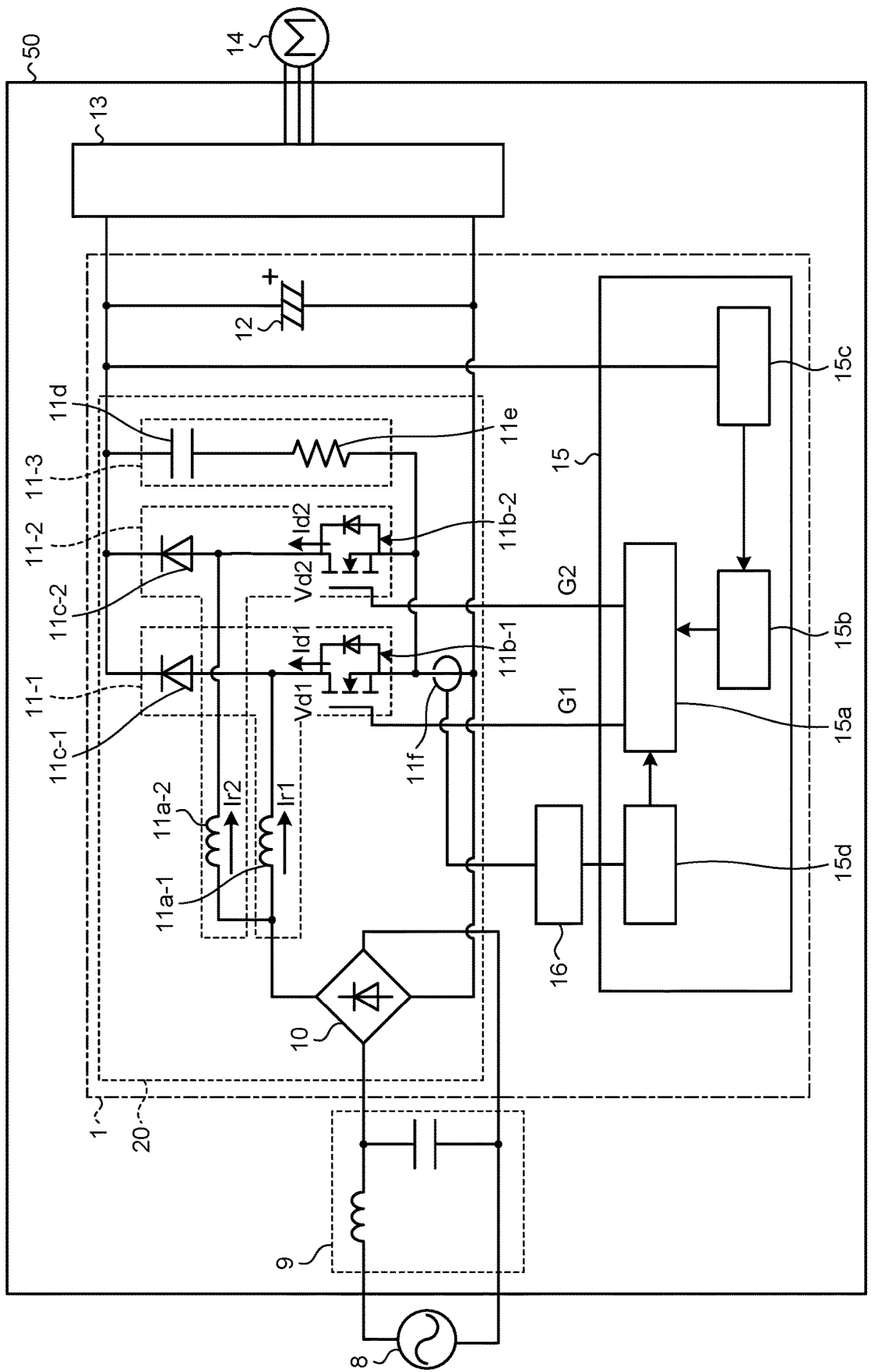
FIG. 2 is a diagram illustrating a circuit configuration of the motor drive apparatus including a power conversion apparatus according to the first embodiment.

FIG. 1 is a diagram showing an exemplary configuration of an air conditioner including a motor drive apparatus according to a first embodiment. Furthermore, FIG. 2 is a diagram illustrating a circuit configuration of the motor drive apparatus including a power conversion apparatus according to the first embodiment.

An air conditioner 100 according to the first embodiment includes an outdoor unit 5 and an indoor unit 7. The outdoor unit 5 and the indoor unit 7 are connected by pipes 6. The outdoor unit 5 includes a motor drive apparatus 50, a compressor 2, a blower 3, and a heat exchanger 4. The motor drive apparatus 50 is connected to the compressor 2 and the blower 3 by electric wires (not illustrated). In addition, the motor drive apparatus 50 is connected to a commercial power supply 8 as illustrated in FIG. 2. The commercial power supply 8 is an example of an AC power supply.

The motor drive apparatus 50 includes an input filter 9, a power conversion apparatus 1, and an inverter 13. The power conversion apparatus 1 includes a converter circuit 20, a smoothing capacitor 12, a control unit 15, and a low-pass filter 16. The power conversion apparatus 1 supplies driving power to a motor 14.

An input side of the power conversion apparatus 1 is connected to the commercial power supply 8 via the input filter 9. An output side of the power conversion apparatus 1 is connected to the inverter 13. An output side of the inverter 13 is connected to the motor 14. The motor 14 is a compressor driving motor to be installed in the compressor 2. The motor 14 may be a blower driving motor to be installed in the blower 3.

The converter circuit 20 converts an AC voltage output from the commercial power supply 8 into a DC voltage. The smoothing capacitor 12 smooths and holds the DC voltage converted by the converter circuit 20. Hereinafter, the AC voltage to be output from the commercial power supply 8 is referred to as a "power supply voltage", as appropriate.

The converter circuit 20 includes a rectifier circuit 10, boost chopper circuits 11-1 and 11-2, a snubber circuit 11-3, and a current sensor 11f. The snubber circuit 11-3 includes a snubber capacitor 11d and a snubber resistor 11e.

In the converter circuit 20, the boost chopper circuits 11-1 and 11-2 are connected in parallel to each other. The boost chopper circuits 11-1 and 11-2 operate in sequence in the range of a predetermined period. This period may be referred to as an "interleaving period".

The rectifier circuit 10 is connected between the input filter 9 and the boost chopper circuits 11-1 and 11-2. The rectifier circuit 10 applies a rectified voltage obtained by rectification of the power supply voltage to each of the boost chopper circuits 11-1 and 11-2. The rectified voltage is a DC voltage having a pulsation component. The pulsation component of the DC voltage will be described below.

The rectifier circuit 10 is generally configured as a full-wave rectifier circuit in which four diodes are bridge-connected. Note that, in the configuration of the full-wave rectifier circuit, one or more diodes may be replaced with switching elements such as a metal-oxide-semiconductor field-effect transistor (MOSFET) so as to obtain a circuit configuration for performing synchronous rectification. In addition, the rectifier circuit 10 may be configured as a half-wave rectifier circuit using only a single diode. In this configuration, since the number of diodes through which input current passes can be reduced, loss to be caused in the rectifier circuit 10 can be reduced.

The boost chopper circuit 11-1 includes a reactor 11a-1, a switching element 11b-1, and a diode 11c-1. The boost chopper circuit 11-2 includes a reactor 11a-2, a switching element 11b-2, and a diode 11c-2.

In the converter circuit 20, a combination of a single reactor and a single switching element is defined as a "phase", and is regarded as "one phase" when counted. FIG. 2 illustrates an example of two phases, which is a configuration of a two-phase interleaving method. The characters "-1" and "-2" have been added so as to distinguish between the two phases. Note that the number of phases in the power conversion apparatus 1 described in the present specification is not limited only to two, and may be three or more.

One end of the reactor 11a-1 is connected to one end of the rectifier circuit 10 and one end of the reactor 11a-2. An opposite end of the reactor 11a-1 is connected to one end of the switching element 11b-1 and an anode of the diode 11c-1. A cathode of the diode 11c-1 is connected to a cathode of the diode 11c-2, one end of the snubber capacitor 11d, and a positive side terminal of the smoothing capacitor 12. An opposite end of the switching element 11b-1 is connected to an opposite end of the switching element 11b-2, one end of the snubber resistor 11e, a negative side terminal of the smoothing capacitor 12, and an opposite end of the rectifier circuit 10. An opposite end of the reactor 11a-2 is connected to one end of the switching element 11b-2 and an anode of the diode 11c-2. An opposite end of the snubber capacitor 11d is connected to an opposite end of a snubber resistor 11e. The converter circuit 20 boosts rectified voltage output from the rectifier circuit 10, and outputs the boosted voltage to the smoothing capacitor 12. In addition, the converter circuit 20 operates such that the peak value, average value, or effective value of output voltage is kept constant by control to be described below.

Note that FIG. 2 illustrates a configuration of the converter circuit 20 that is an interleaved converter circuit using the boost chopper circuits 11-1 and 11-2, but the configuration of the converter circuit 20 is not limited thereto. The converter circuit 20 may be configured such that each of the boost chopper circuits 11-1 and 11-2 is replaced with a step-up/down chopper circuit, a flyback circuit, a fly-forward circuit, a single-ended primary-inductor converter (SEPIC), a Zeta converter, or a Cuk converter.

Examples of the switching elements 11b-1 and 11b-2 include, but are not limited to, the MOSFETs illustrated in FIG. 2. Insulated gate bipolar transistors (IGBTs) may be used instead of the MOSFETs.

In addition, each of the switching elements 11b-1 and 11b-2 includes a diode located between and connected to a drain and a source in an anti-parallel manner. The term "anti-parallel connection" means that the drain of a MOSFET and the cathode of a diode are connected, and the source of the MOSFET and the anode of the diode are connected. Note that a parasitic diode inherent in the MOSFET may be used as the diode described above. Parasitic diodes are also called body diodes.

Furthermore, a semiconductor element made of silicon (Si) is generally used as the switching elements 11b-1 and 11b-2, but a semiconductor element made of silicon carbide (SiC) may be used. The conduction loss of SiC is smaller than the conduction loss of Si, so that SiC enables high-speed switching operation. Therefore, use of SiC allows switching loss to be reduced and the power consumption of the air conditioner 100 to be reduced. In addition, use of SiC also allows heat generation of the switching elements 11b-1 and 11b-2 to be reduced, so that a heat dissipation member for dissipating heat from the switching elements 11b-1 and 11b-2, such as a heat sink, can be reduced in size and manufactured at lower cost. In addition, use of SiC also makes is possible to prevent electronic parts disposed near the switching elements 11*b*-1 and 11*b*-2 from increasing in temperature. It is thus possible to improve the reliability of the apparatus.

Furthermore, a semiconductor element made of gallium nitride (GaN) can be used as a material of the switching elements 11*b*-1 and 11*b*-2. Examples of the semiconductor element made of GaN include a high electron mobility transistor (HEMT). The conduction loss of the HEMT is smaller than the conduction loss of a MOSFET formed of Si, so that the HEMT enables high-speed switching operation. Therefore, use of the HEMT allows switching loss to be reduced and the power consumption of the air conditioner 100 to be reduced, as compared with the MOSFET formed of Si. Furthermore, use of the HEMT also allows the amount of heat generated by the switching elements 11*b*-1 and 11*b*-2 to be reduced. As a result, a heat dissipation member for preventing the switching elements 11*b*-1 and 11*b*-2 from increasing in temperature, such as a heat sink, can be reduced in size and manufactured at lower cost. In addition, use of the HEMT also makes is possible to prevent the electronic parts disposed near the switching elements 11*b*-1 and 11*b*-2 from increasing in temperature. It is thus possible to improve the reliability of the apparatus.

In addition, each of the diodes 11*c*-1 and 11*c*-2 may be replaced with a MOSFET or the above-described HEMT so as to obtain a circuit configuration for synchronous rectification. The circuit configuration for synchronous rectification can achieve reduction of conduction loss to be caused in the diodes 11*c*-1 and 11*c*-2. Accordingly, the power consumption of the air conditioner 100 can be reduced. In addition, use of the MOSFET or HEMT allows the amount of heat generated by the diodes 11*c*-1 and 11*c*-2 to be reduced. As a result, a heat dissipation member for preventing the diodes 11*c*-1 and 11*c*-2 from increasing in temperature, such as a heat sink, can be reduced in size and manufactured at lower cost. In addition, use of the MOSFET or HEMT also makes is possible to prevent electronic parts disposed near the diodes 11*c*-1 and 11*c*-2 from increasing in temperature. It is thus possible to improve the reliability of the apparatus.

The converter circuit 20 boosts the rectified voltage output from the rectifier circuit 10, and performs control such that the average value of voltage of the smoothing capacitor 12 is kept constant. However, the rectified voltage pulsates at a frequency twice a power supply frequency that is the frequency of the power supply voltage. Therefore, voltage output from the converter circuit 20 also pulsates at the frequency twice the power supply frequency. Meanwhile, as described above, the smoothing capacitor 12 smooths voltage output from the converter circuit 20. This reduces a pulsation component of pulsation at the frequency twice the power supply frequency, possibly included in motor current. The motor current is current to be supplied from the inverter 13 to the motor 14.

When current supplied to the motor 14 pulsates, the motor 14, the pipes 6 with which the outdoor unit 5 is equipped, and the like vibrate. This vibration may deteriorate a lead and a soldered portion in a circuit component of the power conversion apparatus 1, and may shorten the life of the air conditioner 100. In addition, vibration sound generated by the vibration greatly affects the quality of the air conditioner 100.

Meanwhile, the smoothing capacitor 12 provided in the power conversion apparatus 1 causes a reduction of the pulsation component of pulsation at the frequency twice the power supply frequency, possibly included in motor current. Therefore, vibration of components including the motor 14 and the pipes 6 is prevented. As a result, it is possible to reduce the cost of parts required as countermeasures against vibration, so that an increase in manufacturing cost can be prevented. In addition, vibration of the components including the motor 14 and the pipes 6 is prevented, so that vibration sound can be reduced. This makes it possible to improve the quality of the air conditioner 100 at lower cost.

The inverter 13 is connected between the smoothing capacitor 12 and the motor 14. A voltage output from the converter circuit 20 and then smoothed by the smoothing capacitor 12 is applied to the inverter 13. Hereinafter, the voltage smoothed by the smoothing capacitor 12 is referred to as a "capacitor voltage", as appropriate. The inverter 13 converts the capacitor voltage into an AC voltage of a desired frequency, and applies the AC voltage to the motor 14.

Note that although a detailed configuration of the inverter 13 is not illustrated, an inverter circuit with a known circuit configuration can be used. Examples of the known inverter circuit include a full-bridge inverter, a half-bridge inverter, and a single-transistor voltage resonance circuit.

The control unit 15 includes a drive unit 15*a*, a calculation unit 15*b*, a voltage detection unit 15*c*, and a current detection unit 15*d*.

The voltage detection unit 15*c* detects a capacitor voltage. A result of detection performed by the voltage detection unit 15*c* is input to the calculation unit 15*b*. The voltage detection unit 15*c* may directly detect the capacitor voltage, or may use a voltage-dividing circuit in which a plurality of resistors are connected in series. The capacitor voltage can be calculated by use of divided voltages obtained by the voltage-dividing circuit.

Values of currents flowing through the switching elements 11*b*-1 and 11*b*-2, detected by the current sensor 11*f* are input to the current detection unit 15*d* via the low-pass filter 16. The current detection unit 15*d* detects current values indicating the magnitudes of the currents flowing through the switching elements 11*b*-1 and 1*b*-2, and transmits detection results to the calculation unit 15*b*. Examples of the current sensor 11*f* include a shunt resistor and a current sensor using a Hall element.

The calculation unit 15*b* performs feedback control on the boost chopper circuits 11-1 and 11-2 based on a value of the capacitor voltage detected by the voltage detection unit 15*c*, such that the capacitor voltage becomes a set voltage. More specifically, the calculation unit 15*b* changes a period in which the switching elements 11*b*-1 and 11*b*-2 are ON, in such a way as to reduce a difference between the value of the voltage detected by the voltage detection unit 15*c* and a reference voltage value. The period in which the switching elements 11*b*-1 and 11*b*-2 are ON is set using the time when the switching elements 11*b*-1 and 11*b*-2 were changed from OFF to ON as a reference.

The calculation unit 15*b* can be configured as a single circuit, a composite circuit, an application specific integrated circuit (ASIC), a field-programmable gate array (FPGA), or a processing circuit obtained by combining them.

Furthermore, the calculation unit 15*b* may include an arithmetic unit and a memory. Examples of the arithmetic unit include, but are not limited to, a microcomputer. The arithmetic unit may also be an arithmetic means referred to as a central processing unit (CPU), a microprocessor, a digital signal processor (DSP), or the like. A program read by the arithmetic unit is stored in the memory, and a result of calculation performed by the arithmetic unit is also stored in the memory. Examples of the memory include nonvolatile or volatile semiconductor memories such as a random access memory (RAM), a read only memory (ROM), a flash memory, an erasable programmable ROM (EPROM), and an electrically EPROM (EEPROM (registered trademark)).

In addition, the calculation unit 15b detects an anomaly in operation of the converter circuit 20 based on the value detected by the current detection unit 15d. When an anomaly in operation of the converter circuit 20 is detected, the calculation unit 15b outputs, to the drive unit 15a, signals for turning off the switching elements 11b-1 and 11b-2 so as to stop the operation of the converter circuit 20. For more specific description, a case where a short-circuit fault occurs in the reactor 11a-1 will be cited as an example. When a short-circuit fault occurs in the reactor 11a-1, an excessive current flows through the switching element 11b-1. The calculation unit 15b that has detected the excessive current of the switching element 11b-1 performs control in such a way as to turn off the switching element 11b-1 to reduce the risk of failure due to the excess current. The calculation unit 15b also performs similar control when an excessive current flows through the switching element 11b-2.

For example, a method of comparing the value detected by the current detection unit 15d with a reference current value just needs to be used for determining whether current flowing through the switching element 11b-1 is excessive.

Note that the calculation unit 15b preferably has an analog-digital (AD) conversion function of converting analog signals transmitted from the voltage detection unit 15c and the current detection unit 15d into digital values. In this case, the voltage detection unit 15c does not need a circuit that generates the reference voltage value, and the current detection unit 15d does not need a circuit that generates the reference current value. As a result, the voltage detection unit 15c and the current detection unit 15d can be made compact. This also facilitates integration of an analog circuit including the voltage detection unit 15c and the current detection unit 15d, so that the control unit 15 can be further reduced in size.

The drive unit 15a receives signals transmitted from the calculation unit 15b, and generates drive signals G1 and G2 by converting the received signals into voltages with magnitudes that allow the ON or OFF of the switching elements 11b-1 and 11b-2 to be controlled. The drive unit 15a applies the drive signals G1 and G2 to the gates of the switching elements 11b-1 and 11b-2, respectively, to cause the switching elements 11b-1 and 11b-2 to perform switching operation. The signals to be transmitted from the calculation unit 15b are voltages of, for example, 3.3 V or 5 V. Furthermore, the voltages of the drive signals G1 and G2 are, for example, 15 V or 18 V.

Figure 3:
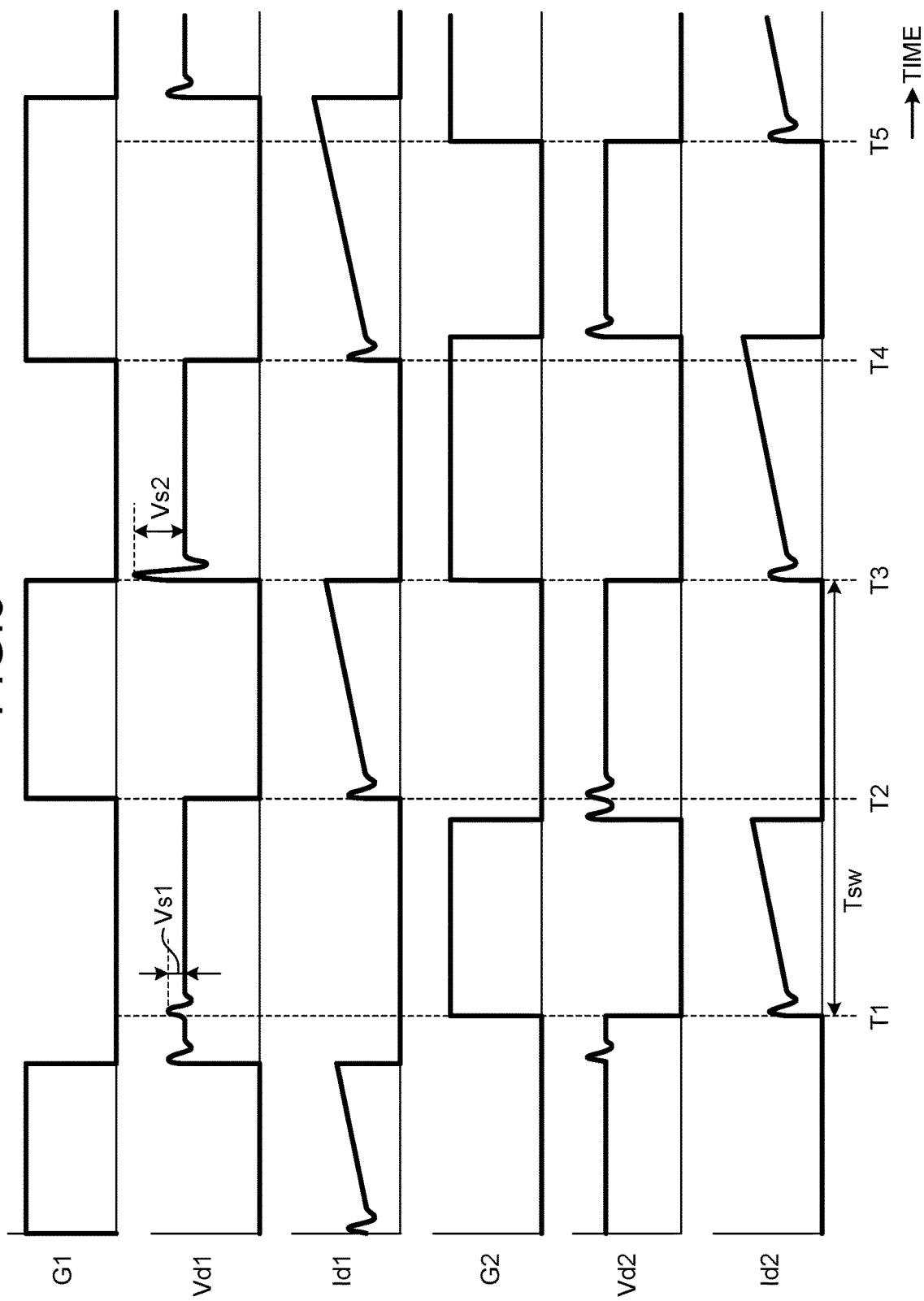
FIG. 3 is a waveform chart for describing surge voltage that may be generated in a converter circuit in the first embodiment.

Next, operation of a main part in the first embodiment will be described. Note that before describing operation of the main part, surge voltage described in the section "Technical Problem" will be described with reference to FIG. 3. FIG. 3 is a waveform chart for describing surge voltage that may be generated in the converter circuit in the first embodiment. The horizontal axis in FIG. 3 represents time. In addition, FIG. 3 illustrates waveforms of the drive signal G1, a drain voltage Vd1 of the switching element 11b-1, a drain current Id1 of the switching element 11b-1, the drive signal G2, a drain voltage Vd2 of the switching element 11b-2, and a drain current Id2 of the switching element 11b-2 in order from the top of the drawing. Furthermore, FIG. 2 illustrates a point at which each of these voltages and currents has been measured. The drain current is a current flowing through each switching element, and the drain voltage is a voltage applied between the drain and source of each switching element.

In FIG. 3, the symbol "Tsw" denotes an operation period for the driving of the switching elements 11b-1 and 11b-2, and is hereinafter referred to as a "reference period". Furthermore, the symbols "T1" to "T5" denote time at which the switching elements 11b-1 and 11b-2 are turned on, that is, switched from OFF to ON. As illustrated in FIG. 3, the reference period Tsw is equal to a period between time T1 and time T3.

The switching elements 11b-1 and 11b-2 repeat ON operation and OFF operation in the reference period Tsw. In addition, a preset phase difference is provided for the timings of turning on the switching elements 11b-1 and 11b-2. The converter circuit 20 illustrated in FIG. 2 has a configuration of a two-phase interleaving method, where a phase difference of Tsw/2 has been provided for the timings of turning on the switching elements 11b-1 and 11b-2. Note that, in a case where the converter circuit 20 uses, for example, a three-phase interleaving method or a four-phase interleaving method, a phase difference of Tsw/3 or Tsw/4 is provided, respectively.

Surge voltages are generated in the drain voltages at the timings of turning on the switching elements 11b-1 and 11b-2. For example, at time T1, a surge voltage having a magnitude of Vs1 is generated. The surge voltage is a spike-like voltage. Surge voltage is generated in the converter circuit 20 due to parasitic inductance of printed wiring connecting the components of the converter circuit 20, jumper wiring, or the smoothing capacitor 12 and the current sensor 11f. Furthermore, surge voltage is generated when drain current steeply changes from a value of zero in response to the turning on of the switching elements 11b-1 and 11b-2. Similarly, surge voltage is also generated when the switching elements 11b-1 and 11b-2 are switched from ON to OFF, that is, when the switching elements 11b-1 and 11b-2 are turned off.

The snubber capacitor 11d and the snubber resistor 11e are components for reducing surge voltage. The electrostatic capacitance of the snubber capacitor 11d and the resistance of the snubber resistor 11e are chosen such that the drain voltages of the switching elements 11b-1 and 11b-2 are less than a rated voltage. In general, as the electrostatic capacitance of the snubber capacitor 11d increases and the resistance of the snubber resistor 11e decreases, the height of surge voltage, that is, the magnitude of the surge voltage can be reduced.

When surge voltage is generated, noise may be generated in the output of the current sensor 1 if or other sensors disposed near the switching elements 11b-1 and 11b-2. The low-pass filter 16 is used as a countermeasure against such noise, and can be configured by use of circuit elements including a resistor and a capacitor.

As described above, the converter circuit 20 controls periods of time during which the switching elements 11b-1 and 11b-2 are ON, such that the peak value, average value, or effective value of output voltage is constant. Therefore, the timings of turning off the switching elements 11b-1 and 11b-2 are not constant, and are changed, for example, as illustrated in FIG. 3.

In FIG. 3, at time T3, the timing of turning off the switching element 11b-1 is relatively close to or overlaps with the timing of turning on the switching element 11b-2. In this case, since the respective drain currents of the switching elements 11b-1 and 11b-2 both change steeply, voltages thereof are superimposed on each other, leading to a surge voltage Vs2 higher than the surge voltage Vs1.

The above is the reason why surge voltage is generated. As described in the section "Technical Problem", in order to reduce surge voltage, it is necessary to increase the capacity of the snubber circuit 11-3. This causes a problem in that the snubber capacitor 11d and the snubber resistor 11e to be used for the snubber circuit 11-3 increase in size, and the snubber circuit 11-3 increases in cost, so that the manufacturing cost of the snubber circuit 11-3 increases.

In addition, as described above, noise to be generated in the output of the current sensor 1 if or the other sensors disposed near the switching elements 11b-1 and 11b-2 may increase. When the number of parts to be included in the low-pass filter 16 is increased as a countermeasure against this noise, there arises a problem in that the low-pass filter 16 increases in size and the parts become expensive, so that the manufacturing cost of the low-pass filter 16 increases.

Figure 4:
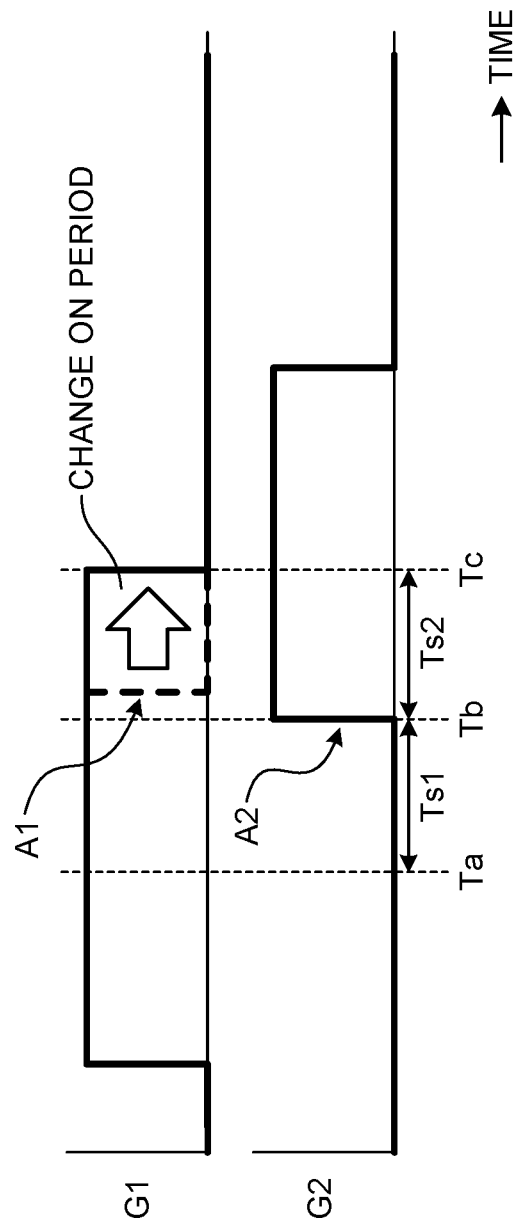
FIG. 4 is a first waveform chart for describing operation of the converter circuit in the first embodiment.
Figure 5:
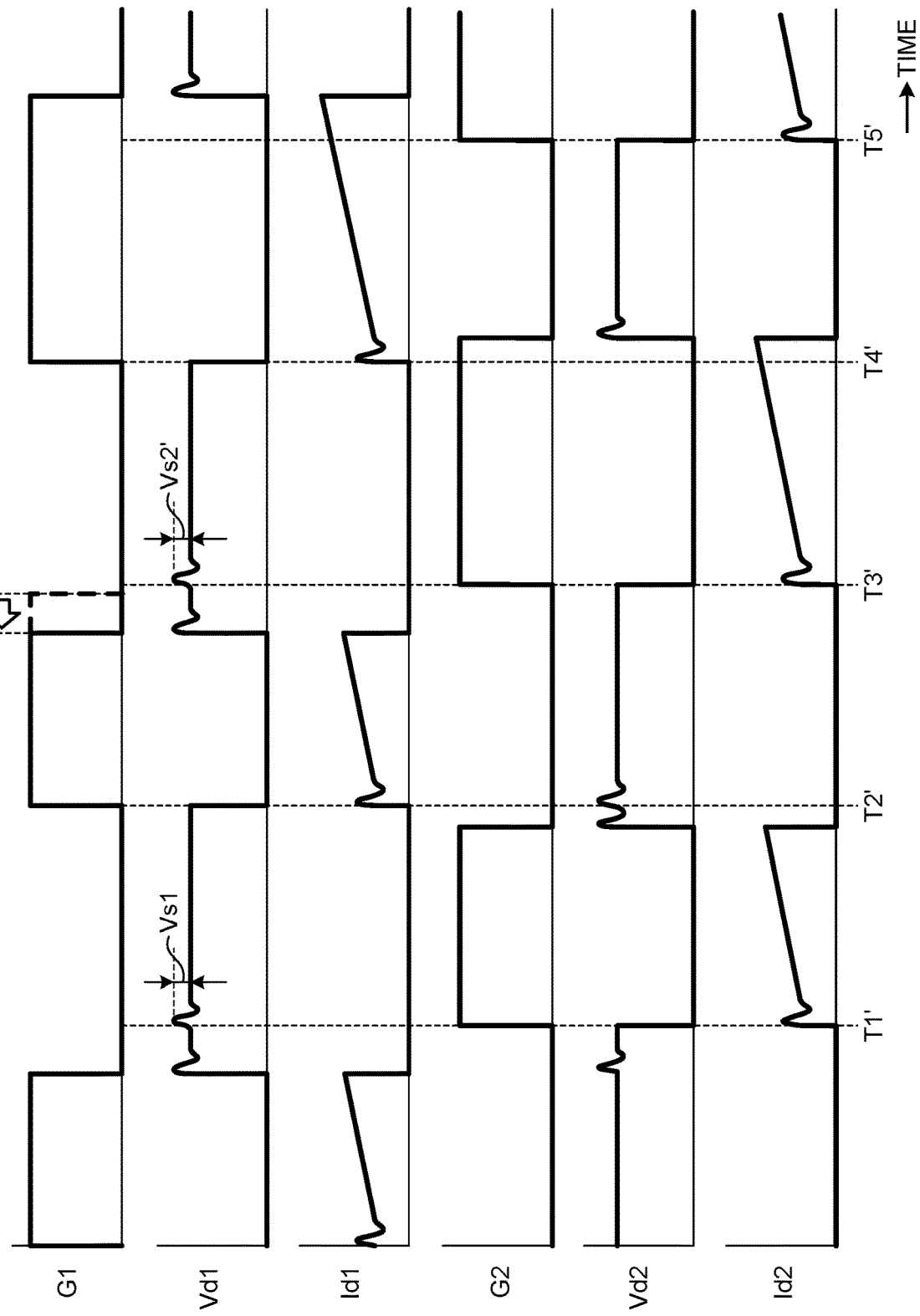
FIG. 5 is a second waveform chart for describing operation of the converter circuit in the first embodiment.

Next, a control method according to the first embodiment for solving the above-described problems will be described with reference to FIGS. 4 and 5. FIG. 4 is a first waveform chart for describing operation of the converter circuit in the first embodiment. FIG. 5 is a second waveform chart for describing operation of the converter circuit in the first embodiment. The horizontal axes in FIGS. 4 and 5 represent time. A waveform of the drive signal G1 is illustrated in the upper part of FIG. 4, and a waveform of the drive signal G2 is illustrated in the lower part of FIG. 4. Furthermore, FIG. 5 illustrates waveforms arranged in the same order as in FIG. 3. Furthermore, in each of the operation waveforms of FIGS. 4 and 5, a thick broken line indicates a waveform to be obtained when the control according to the first embodiment is not performed, and a thick solid line indicates a waveform to be obtained when the control according to the first embodiment is performed.

The waveform of the drive signal for the switching element 11b-1 is illustrated in the upper part of FIG. 4, and the waveform for the drive signal of the switching element 11b-2 is illustrated in the lower part of FIG. 4. As illustrated in FIG. 4, with time Tb at which the switching element 11b-2 is turned on as a reference time point, the time that is Ts1 before time Tb is defined as time Ta and the time that is Ts2 after time Tb is defined as time Tc. Hereinafter, the symbol "Ts1" is referred to as "period Ts1", and the symbol "Ts2" is referred to as "period Ts2". That is, time Ta is the time going back in time the period Ts1 from time Tb serving as a reference time point, and time Tc is the time that comes after the elapse of the period Ts2 from time Tb serving as a reference time point.

Before the control according to the first embodiment is performed, a rising portion A2 of the drive signal G2 rising at time Tb is relatively close to a falling portion A1 of the drive signal G1 falling after time Tb, as illustrated in FIG. 4. Therefore, there is a concern about generation of the surge voltage described above. Thus, the timing of turning off the switching element 11b-1 is changed.

Specifically, in a case where the timing of turning off the switching element 11b-1 falls within the period Ts2 after time Tb at which the switching element 11b-2 is turned on, control is performed for delaying the timing of turning off the switching element 11b-1 to time Tc, as illustrated.

Furthermore, although not illustrated, in a case where the timing of turning off the switching element 11b-1 falls within the period Ts1 before time Tb at which the switching element 11b-2 is turned on, control is performed for advancing the timing of turning off the switching element 11b-1 to time Ta.

The above-described "control for advancing" the timing of turning off the switching element 11b-1 and "control for delaying" the timing of turning off the switching element 11b-1 are collectively referred to as "avoidance control", as appropriate. Note that an example of changing the timing of turning off the switching element 11b-1 has been described here, while similar avoidance control is also performed for the timing of turning off the switching element 11b-2.

Furthermore, a description has been given above of a concern about surge voltage that may be generated when the rising portion A2 of the drive signal G2 is relatively close to the falling portion A1 of the drive signal G1. Meanwhile, the degree of generation of surge voltage depends on various circuit elements such as the speeds of switching of the switching elements 11b-1 and 11b-2, the inductances of the reactors 11a-1 and 11a-2, and the capacity of the snubber circuit 11-3. Various methods can be adopted as the avoidance control. Meanwhile, in the present specification, a method will be cited as an example in which a time difference between the timing of turning off the switching element 11b-1 and the timing of turning on the switching element 11b-2 is compared with a preset threshold. Specifically, in a case where a time difference between the timing of turning off a first switching element and the timing of turning on a second switching element is within the threshold, the calculation unit 15b performs control for advancing or delaying the timing of turning off the first switching element. Note that, here, the first switching element refers to the switching element 11b-1 or the switching element 11b-2, and the second switching element refers to a switching element different from the first switching element.

FIG. 5 illustrates operation waveforms to be obtained in a case where the avoidance control illustrated in FIG. 4 is performed. At time T3', the timing of turning off the switching element 11b-1 is relatively close to the timing of turning on the switching element 11b-2. Furthermore, the timing of turning off the switching element 11b-1 falls within the period Ts1. Therefore, the timing of turning off the switching element 11b-1 is advanced by the avoidance control. Due to this control, the timings at which the respective drain currents of the switching elements 11b-1 and 11b-2 change steeply are shifted, so that superposition of surge voltages is prevented. As a result, the surge voltage Vs2 illustrated in FIG. 3 has been reduced in FIG. 5 to a surge voltage Vs2' lower than the surge voltage Vs2.

Figure 6:
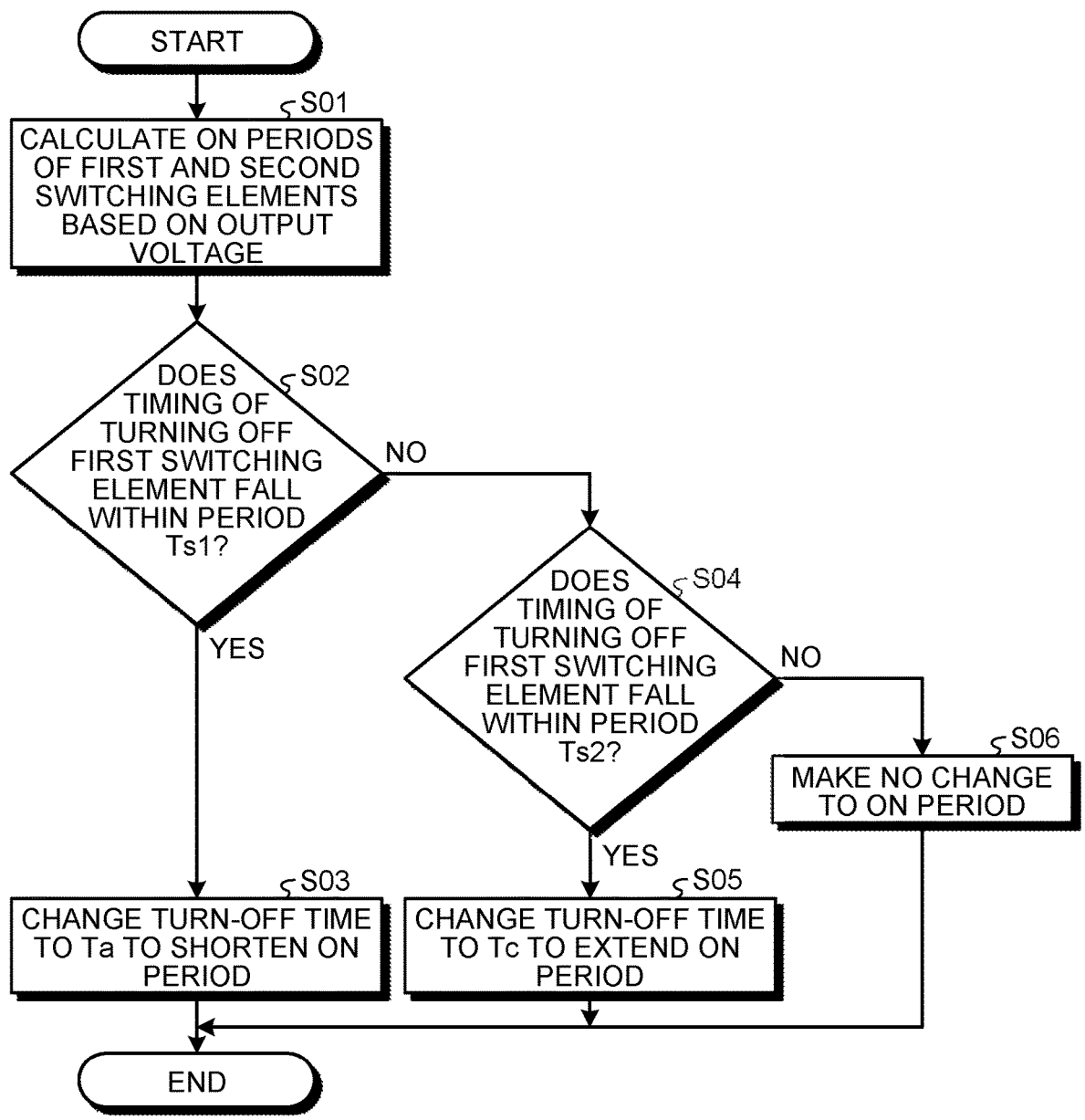
FIG. 6 is a flowchart illustrating an operation flow of avoidance control to be performed in the first embodiment.

FIG. 6 is a flowchart illustrating an operation flow of the avoidance control to be performed in the first embodiment. First, when the converter circuit 20 starts operating, the calculation unit 15b calculates ON periods of the first and second switching elements based on an output voltage detected by the voltage detection unit 15c (step S01). Next, the calculation unit 15b determines whether the timing of turning off the first switching element falls within the period Ts1 (step S02). As illustrated in FIG. 4, the period Ts1 is set based on the timing of turning on the second switching element.

When the timing of turning off the first switching element falls within the period Ts1 (step S02, Yes), turn-off time is changed from Tb to Ta to shorten the ON period as illustrated in FIG. 4 (step S03). Furthermore, when the timing of turning off the first switching element does not fall within the period Ts1 (step S02, No), the calculation unit 15b determines whether the timing of turning off the first switching element falls within the period Ts2 (step S04). As illustrated in FIG. 4, the period Ts2 is also set based on the timing of turning on the second switching element.

When the timing of turning off the first switching element falls within the period Ts2 (step S04, Yes), the turn-off time is changed from Tb to Tc to extend the ON period as illustrated in FIG. 4 (step S05). Furthermore, when the timing of turning off the first switching element does not fall within the period Ts2 (step S04, No), the ON period is not changed (step S06). The ON period of the first switching element is determined by the above processing.

Note that the lengths of the periods Ts1 and Ts2 are preferably longer than delay time between the input of the drive signal G1 to the gate of the switching element 11b-1 and actual completion of operation of the switching element 11b-1 and delay time between the input of the drive signal G2 to the gate of the switching element 11b-2 and actual completion of operation of the switching element 11b-2.

Specifically, in a case where Td off is defined as delay time between the input of the drive signal G1, which is a drive signal for turning off the switching element 11b-1, to the gate of the switching element 11b-1 and actual completion of the turning off of the switching element 11b-1, the period Ts1 is set such that Ts1>Td off. The same applies to the switching element 11b-2. This can ensure that, in a case where the ON period of the switching element 11b-1 or the switching element 11b-2 is shortened, the turn-off timing and the turn-on timing for the switching elements 11b-1 and 11b-2 do not coincide with each other.

Furthermore, in a case where Td on is defined as delay time between the input of the drive signal G2, which is a drive signal for turning on the switching element 11b-2, to the gate of the switching element 11b-2 and actual completion of the turning on of the switching element 11b-2, the period Ts2 is set such that Ts2>Td on. The same applies to the switching element 11b-1. This can ensure that, in a case where the ON period of the switching element 11b-1 or the switching element 11b-2 is extended, the turn-off timing and the turn-on timing for the switching elements 11b-1 and 11b-2 do not coincide with each other.

As described above, in a case where the time difference between the timing of turning off the first switching element and the timing of turning on the second switching element, which is different from the first switching element, is within the threshold, the control unit included in the power conversion apparatus according to the first embodiment performs avoidance control for advancing or delaying the timing of turning off the first switching element. This control can ensure that the turn-off timing and the turn-on timing for the first and second switching elements do not coincide with each other. Accordingly, it is possible to prevent the boost chopper circuits from increasing in size and manufacturing cost. In addition, it is possible to prevent the snubber circuit from increasing in size and manufacturing cost. Furthermore, it is possible to prevent the low-pass filter from increasing in size and manufacturing cost. Therefore, the power conversion apparatus according to the first embodiment makes it possible to prevent generation of surge voltage while preventing an increase in the size and manufacturing cost of the apparatus.

Second Embodiment

FIG. 7 is a waveform chart for describing operation of a converter circuit in a second embodiment. Note that, in the second embodiment, the configuration of a power conversion apparatus including the converter circuit is the same as or equivalent to the configuration of the power conversion apparatus 1 illustrated in FIG. 2, and redundant description will be omitted.

FIG. 7 illustrates waveforms of the drive signal G1, a reactor current Ir1 flowing through the reactor 11a-1, the drive signal G2, and a reactor current Ir2 flowing through the reactor 11a-2 in order from the top of the drawing. Furthermore, in FIG. 7, the meanings of thick broken lines and thick solid lines in the operation waveforms are the same as those in FIGS. 4 and 5. That is, the thick broken lines indicate waveforms to be obtained when control according to the second embodiment is not performed, and the thick solid lines indicate waveforms to be obtained when the control according to the second embodiment is performed.

A state in which operation of shortening the waveform of the drive signal G1 and operation of extending the waveform of the drive signal G1 are alternately repeated is illustrated in the upper part of FIG. 7. In addition, a state in which operation of shortening the waveform of the drive signal G2 and operation of extending the waveform of the drive signal G2 are alternately repeated is illustrated in the middle lower part of FIG. 7. That is, in the control in the second embodiment, in a case where the turn-off timing is advanced, control is performed in such a way as to delay the turn-off timing in next switching control. Furthermore, in a case where the turn-off timing is delayed, control is performed in such a way as to advance the turn-off timing in next switching.

When the avoidance control for shortening or extending the ON period of the switching element 11b-1 is performed in the control according to the first embodiment, a duty changes which is the ratio of a period of time during which the switching element 11b-1 is ON to the reference period Tsw. When the duty changes, the reactor current Ir1 fluctuates, so that harmonics of input current may increase.

More specifically, in a case where the ON period of the switching element 11b-1 is shortened by the avoidance control according to the first embodiment, the input current decreases as a result of a decrease in the duty. In addition, in a case where the ON period of the switching element 11b-1 is extended by the avoidance control according to the first embodiment, the input current increases as a result of an increase in the duty. The same applies to the switching element 11b-2.

Therefore, control for preventing an increase or a decrease in the input current, that is, control for preventing a fluctuation in the input current is performed in the second embodiment. Specifically, control to be described below is performed.

In FIG. 7, avoidance control for shortening the ON period of the switching element 11b-1 is performed at time T1". In this case, a current amplitude Idf1 of average current of the reactor 11a-1 based on a zero level decreases as compared with a case where the avoidance control is not performed. In this state, if the avoidance control for shortening the ON period of the switching element 11b-1 is further performed at time T3", the current amplitude Idf1 further decreases. As a result, the fluctuation of the input current further increases.

Therefore, in the second embodiment, control is performed at time T3" not for extending the ON period, but for shortening the ON period. This makes it possible to prevent the duty from continuing to decrease. As a result, a decrease in the current amplitude Idf1 is prevented, so that the fluctuation of the input current can also be prevented.

FIG. 8 is a flowchart illustrating an operation flow of control to be performed in the second embodiment. First, when the converter circuit 20 starts operating, the calculation unit 15b determines whether to perform avoidance control (step S11). Needless to say, the ON periods of the first and second switching elements are calculated before the calculation unit 15b determines whether to perform avoidance control.

When the calculation unit 15b determines that avoidance control is not to be performed (step S11, No), the calculation unit 15b continues the processing of step S11.

Meanwhile, when the calculation unit 15*b* determines that avoidance control is to be performed (step S11, Yes), avoidance control is performed and the process proceeds to step S12. The calculation unit 15*b* determines whether the avoidance control performed in step S11 was control for shortening the ON period (step S12). When the avoidance control performed in step S11 was control for shortening the ON period (step S12, Yes), the calculation unit 15*b* performs control for extending the ON period in next avoidance control (step S13). Meanwhile, when the avoidance control performed in step S11 was not control for shortening the ON period (step S12, No), that is, when the avoidance control performed in step S11 was control for extending the ON period, the calculation unit 15*b* performs control for shortening the ON period in the next avoidance control (step S14). After the processing of steps S13 and S14, the process returns to step S11 and the above processing is repeated.

Summarizing the control to be performed in steps S12 to S14 described above, when the timing of turning off the first switching element is advanced by the avoidance control according to the first embodiment, control is performed in the next avoidance control of the first switching element such that the turn-off timing is delayed. In addition, when the timing of turning off the first switching element is delayed by the avoidance control according to the first embodiment, control is performed in the next avoidance control of the first switching element such that the turn-off timing is advanced. With this control, it is possible to prevent the fluctuation of current input to the power conversion apparatus. As a result, it is possible to further achieve the effect of preventing harmonics of input current from increasing, in addition to the effect of the first embodiment.

Note that when the switching elements 11*b*-1 and 11*b*-2 are enclosed in a single module, that is, when the switching elements 11*b*-1 and 11*b*-2 are packaged as a single module, the switching elements 11*b*-1 and 11*b*-2 are located at a relatively short distance. The control according to the first and second embodiments can be suitably used for such a configuration.

Furthermore, the configurations set forth in the above embodiments show examples, and it is possible to combine the configurations with another known technique, and is also possible to partially omit or change the configurations without departing from the scope of the present disclosure.

The invention claimed is:

1. A power conversion apparatus comprising:
   a converter circuit to convert an AC voltage output from an AC power supply into a DC voltage, the converter circuit including circuits for the number of phases being more than one, the circuits each including a reactor and a switching element connected to the reactor; and
   control circuitry to control operation of a plurality of the switching elements, wherein
   in a case where a time difference between a timing of turning off a first switching element that is one of the switching elements and a timing of turning on a second switching element that is different from the first switching element is within a threshold, the control circuitry performs avoidance control for advancing or delaying the timing of turning off the first switching element, and
   the control circuitry determines whether to advance or delay the timing of turning off the first switching element based on a result of previous avoidance control.

2. The power conversion apparatus according to claim 1, wherein
   in a case where the timing of turning off the first switching element is advanced in the avoidance control, the control circuitry delays the timing of turning off the first switching element in next avoidance control of the first switching element.

3. The power conversion apparatus according to claim 1, wherein
   in a case where the timing of turning off the first switching element is delayed in the avoidance control, the control circuitry advances the timing of turning off the first switching element in next avoidance control of the first switching element.

4. The power conversion apparatus according to claim 1, wherein
   an amount of time by which the timing of turning off the first switching element is advanced is longer than an amount of time between a start of turning off of the first switching element and completion of the turning off of the first switching element.

5. The power conversion apparatus according to claim 1, wherein
   an amount of time by which the timing of turning off the first switching element is delayed is longer than an amount of time between a start of turning on of the second switching element and completion of the turning on of the second switching element.

6. The power conversion apparatus according to claim 1, wherein
   the switching elements are enclosed in a single module.

7. A motor drive apparatus comprising the power conversion apparatus according to claim 1.

8. An air conditioner comprising the motor drive apparatus according to claim 7.

* * * * *